(12) United States Patent
Ma et al.

(10) Patent No.: US 12,730,343 B2
(45) Date of Patent: Sep. 8, 2026

(54) LIGHT-ADJUSTING STRUCTURE, LIGHT-ADJUSTING GLASS AND EDGE SEALING PROCESS THEREOF

(71) Applicant: SAINT-GOBAIN GLASS FRANCE, Courbevoie (FR)

(72) Inventors: Siteng Ma, Shanghai (CN); Lu Wang, Shanghai (CN)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 0 days.

(21) Appl. No.: 18/554,584

(22) PCT Filed: May 10, 2022

(86) PCT No.: PCT/CN2022/091879

§ 371 (c)(1),
(2) Date: Oct. 9, 2023

(87) PCT Pub. No.: WO2022/237753

PCT Pub. Date: Nov. 17, 2022

(65) Prior Publication Data

US 2024/0201542 A1 Jun. 20, 2024

(30) Foreign Application Priority Data

May 12, 2021 (CN) ........................ 202110518335.2

(51) Int. Cl.
*G02F 1/1339* (2006.01)
*G02F 1/1334* (2006.01)
(Continued)

(52) U.S. Cl.
CPC .......... *G02F 1/1339* (2013.01); *G02F 1/1334* (2013.01); *G02F 1/161* (2013.01); *G02F 1/134309* (2013.01)

(58) Field of Classification Search
CPC ...... G02F 1/1339; G02F 1/1334; G02F 1/161; G02F 1/134309
(Continued)

(56) References Cited

U.S. PATENT DOCUMENTS

2010/0225871 A1* 9/2010 Maruyama ............ G02F 1/1341 445/25
2010/0264817 A1* 10/2010 Bouten ................ H10K 59/127 313/512
(Continued)

FOREIGN PATENT DOCUMENTS

CN 102067032 A 5/2011
CN 102859422 A 1/2013
(Continued)

OTHER PUBLICATIONS

English machine translation of CN111897172A (Year: 2020).*
(Continued)

*Primary Examiner* — David Y Chung
(74) *Attorney, Agent, or Firm* — CUSHMAN PARTNERS LLC

(57) ABSTRACT

A light-adjusting structure includes a first base layer and a second base layer, a first conductive layer and a second conductive layer sandwiched between the first base layer and the second base layer, the first conductive layer being attached to the first base layer and the second conductive layer being attached to the second base layer; and a light-adjusting layer sandwiched between the first conductive layer and the second conductive layer; wherein the light-adjusting structure is provided with an edge-sealing area which penetrates through at least a part of the first base layer, the first conductive layer, the light-adjusting layer and/or at least a part of the second base layer, the second conductive layer and the light-adjusting layer, and the edge-sealing area
(Continued)

is configured to be matched with a first edge-sealing material or provided with the first edge-sealing material.

34 Claims, 7 Drawing Sheets

(51) Int. Cl.
*G02F 1/1343* (2006.01)
*G02F 1/161* (2006.01)

(58) Field of Classification Search
USPC .......................................... 349/110, 149, 153
See application file for complete search history.

(56) References Cited

U.S. PATENT DOCUMENTS

| | | | | |
|---|---|---|---|---|
| 2012/0120364 | A1* | 5/2012 | Wu | G02F 1/167 445/25 |
| 2018/0373072 | A1* | 12/2018 | Zang | G02F 1/1339 |
| 2019/0181378 | A1* | 6/2019 | Song | H10K 50/844 |
| 2020/0150507 | A1* | 5/2020 | Chen | B32B 17/10211 |
| 2022/0072828 | A1 | 3/2022 | Zhang et al. | |
| 2022/0347975 | A1* | 11/2022 | Mannheim Astete | G02F 1/0107 |

FOREIGN PATENT DOCUMENTS

| | | | | |
|---|---|---|---|---|
| CN | 105334658 A | | 2/2016 | |
| CN | 107390436 A | | 11/2017 | |
| CN | 110794608 A | | 2/2020 | |
| CN | 111155901 A | | 5/2020 | |
| CN | 111708200 A | | 9/2020 | |
| CN | 111897172 A | * | 11/2020 | G02F 1/161 |
| CN | 112612158 A | | 4/2021 | |
| WO | WO 2010/032068 A1 | | 3/2010 | |
| WO | WO2020/143984 A1 | | 7/2020 | |
| WO | WO 2020/255094 A1 | | 12/2020 | |

OTHER PUBLICATIONS

International Search Report as issued in International Patent Application No. PCT/CN2022/091879, dated Aug. 18, 2022.
Communication pursuant to Article 94(3) EPC as issued in European Patent Application No. 22806716.1, dated Jul. 7, 2026.
First Office Action as issued in Chinese Patent Application No. 202110518335.2, dated Jul. 11, 2026.

* cited by examiner

LIGHT-ADJUSTING STRUCTURE, LIGHT-ADJUSTING GLASS AND EDGE SEALING PROCESS THEREOF

CROSS-REFERENCE TO RELATED APPLICATIONS

This application is the U.S. National Stage of PCT/CN2022/091879, filed May 10, 2022, which in turn claims priority to Chinese patent application number 202110518335.2 filed May 12, 2021. The content of these applications are incorporated herein by reference in their entireties.

FIELD OF THE INVENTION

The present disclosure relates to the field of glass manufacturing, in particular to a light-adjusting structure and edge sealing process thereof, as well as a light-adjusting glass with the light-adjusting structure and edge sealing process thereof.

BACKGROUND OF THE INVENTION

With people's increasing demand for privacy and comfort when riding vehicle, light-adjusting glass combining light-adjusting structure with glass came into being. The light-adjusting structure is an electronic light-adjusting product, such as a light-adjusting film. By controlling the applied electric field, the light-adjusting film can be changed between two states, such as colorless and transparent state, and milky white and opaque state, to achieve the effect of controlling light transmission. The light-adjusting glass is mostly made of laminated glass. The light-adjusting film is hot-pressed between two glasses through an adhesive layer, which plays a bonding role, and PVB (polyvinyl butyral) is mostly used. PVB has good adhesion to the glass, and has properties including transparency, heat resistance, cold resistance, high mechanical strength, etc. It contains a certain amount of plasticizer or plasticizing agent and other additive molecules to improve the cold resistance and heat resistance of the material.

The light-adjusting film is mainly composed of a light-adjusting layer (for example, polymer resin and liquid crystal) sandwiched between two conductive layers. As shown in FIG. 1, the light-adjusting film 10 includes a first base layer 11 and a second base layer 12, between which a first conductive layer 13 and a second conductive layer 14 are sandwiched, and a light-adjusting layer 15 is sandwiched between the first conductive layer 13 and the second conductive layer 14. In the process of forming a light-adjusting glass under high temperature and high pressure, the cutting edge of the light-adjusting film is completely exposed and thus the light-adjusting layer 15 is in direct contact with the adhesive layer (such as PVB), the plasticizer in the adhesive layer will react with the liquid crystal polymer (PDLC) in the light-adjusting layer, and the reacted part will become transparent, resulting in poor light-adjusting effect or even failure.

At present, some edge-sealing techniques of the light-adjusting film have been proposed to improve the edge defects of the light-adjusting film. For example, in some technologies, the edge of the light-adjusting film is glued to achieve sealing. However, there are still some defects such as uneven gluing and weak bonding, which make the light-adjusting film cannot meet the required light-adjusting effect when applied to the light-adjusting glass, and increase the production cost and process time. Moreover, the prior art is only applicable to the light-adjusting film with straight edges, which also limits the application range and design flexibility of the light-adjusting film.

SUMMARY OF THE INVENTION

An object of the present disclosure is to improve the existing light-adjusting structure and its edge sealing process, and enhance the edge sealing stability of the light-adjusting structure, so as to improve the edge sealing effect when the light-adjusting structure is applied to the light-adjusting glass. Another object of the present disclosure is to improve the light-adjusting glass and its edge sealing process, and enhance the light-adjusting effect of the light-adjusting glass laminated with the light-adjusting structure.

To this end, according to one aspect of the present disclosure, a light-adjusting structure is provided. The light-adjusting structure comprises a first base layer and a second base layer; a first conductive layer and a second conductive layer sandwiched between the first base layer and the second base layer, the first conductive layer is attached to the first base layer and the second conductive layer is attached to the second base layer; and a light-adjusting layer is sandwiched between the first conductive layer and the second conductive layer. The light-adjusting structure is provided with an edge-sealing area which penetrates through at least a part of the first base layer, the first conductive layer, the light-adjusting layer and/or at least a part of the second base layer, the second conductive layer and the light-adjusting layer, and the edge-sealing area is configured to be matched with a first edge-sealing material or provided with a first edge-sealing material.

In at least one embodiment, by providing the edge-sealing area in a completely or partially edge-sealing manner, the edge of the light-adjusting structure or a specific area can be sealed by the matched first edge-sealing material. When applied to a light-adjusting glass, it effectively solves the problem that the light-adjusting layer of the light-adjusting structure is eroded by the adhesive layer of the light-adjusting glass, so as to ensure the light-adjusting effect, and also provides more feasibility for product diversification and different customer requirements. For example, film manufacturers can only manufacture films with grooves in edge-sealing areas, and the first edge-sealing material can be provided by glass manufacturers when the edge-sealing areas of the light-adjusting structure are applied on site, thus avoiding unstable factors that lead to edge-sealing failure during transportation and storage.

According to the above technical concept, the embodiments of the light-adjusting structure of the present disclosure may further include any one or more of the following optional forms.

In some optional forms, the light-adjusting layer comprises a polymer dispersed liquid crystal, a suspended particle device, an electrochromic layer or a liquid crystal layer.

In some optional forms, the edge-sealing area is configured as an edge-sealing groove adjacent to the edge of the light-adjusting structure or an edge-sealing step arranged on the edge.

In some optional forms, the first edge-sealing material is a transparent material selected from at least one of epoxy adhesive, acrylate adhesive, polyurethane adhesive and silicone adhesive.

In some optional forms, the first base layer and the second base layer are transparent materials selected from at least one of polyethylene terephthalate and polyvinyl chloride.

In some optional forms, the first conductive layer and the second conductive layer are transparent materials selected from at least one of indium tin oxide, copper mesh, silver screen printing, conductive nanoparticles, conductive polymer and doped inorganic oxide.

According to another aspect of the present disclosure, an edge sealing process of a light-adjusting structure is provided. The edge sealing process is used for edge sealing the above light-adjusting structure and at least comprises:

cutting: cutting through at least a part of the first base layer, the first conductive layer and the light-adjusting layer and/or at least a part of the second base layer, the second conductive layer and the light-adjusting layer of the light-adjusting structure to form the edge-sealing area;

gluing: coating the first edge-sealing material on the edge-sealing area;

curing: curing the first edge-sealing material to form an edge sealing.

According to the above technical concept, the embodiments of the edge sealing process of a light-adjusting structure of the present disclosure may further include any one or more of the following optional forms.

In some optional forms, it further comprises cleaning the edge-sealing area with a solvent after the cutting.

In some optional forms, the solvent comprises alcohol or acetone.

In some optional forms, the first edge-sealing material is cured by one or a combination of thermal curing, light curing and environmental curing.

According to another aspect of the present disclosure, a light-adjusting glass is provided. The light-adjusting glass comprises a first glass, a second glass and an intermediate layer arranged between the first glass and the second glass. The intermediate layer comprises a first intermediate layer attached to the first glass and a second intermediate layer attached to the second glass. A light-adjusting structure is arranged between the first intermediate layer and the second intermediate layer, and the edge of the light-adjusting structure is attached to the first intermediate layer and the second intermediate layer via a second edge-sealing material.

In at least one embodiment, by attaching the edge of the light-adjusting structure to the first intermediate layer and the second intermediate layer of the light-adjusting glass via the second edge-sealing material, the light-adjusting glass can obtain good edge-sealing effect regardless of whether the light-adjusting structure has the first edge-sealing material or not.

According to the above technical concept, the embodiments of the light-adjusting glass of the present disclosure may further include any one or more of the following optional forms.

In some optional forms, the light-adjusting structure is provided with an edge-sealing area, and the edge-sealing area is configured to be matched with a first edge-sealing material or provided with a first edge-sealing material.

In some optional forms, it further comprises a third edge-sealing material attached to the edge of the first intermediate layer and/or a fourth edge-sealing material attached to the edge of the second intermediate layer.

In some optional forms, the second edge-sealing material, the third edge-sealing material and the fourth edge-sealing material correspond to annular shapes, and wherein the inner edges of the annular shapes corresponding to the third edge-sealing material and the fourth edge-sealing material are indented relative to the inner edge of the annular shape corresponding to the second edge-sealing material.

In some optional forms, the second edge-sealing material is configured as a film layer sandwiched between the first intermediate layer and the light-adjusting structure and between the second intermediate layer and the light-adjusting structure adjacent to the edge of the light-adjusting structure, and the film layer extends beyond the edge of the light-adjusting structure and covers the edge of the light-adjusting structure in the lamination process of the light-adjusting glass.

In some optional forms, it further comprises a picture frame structure.

In some optional forms, the second edge-sealing material is configured as a U-shaped structure sandwiched between the first intermediate layer and the second intermediate layer adjacent to the edge of the light-adjusting structure and covering the edge of the light-adjusting structure.

In some optional forms, the second edge-sealing material is a transparent material selected from at least one of epoxy adhesive, acrylate adhesive, polyurethane adhesive, silicone adhesive, ethylene-vinyl acetate copolymer, polyethylene terephthalate and polyolefin elastomer.

According to another aspect of the present disclosure, an edge sealing process of a light-adjusting glass is provided. The edge sealing process is used for edge sealing the above light-adjusting glass and at least comprises:

overlapping: sandwiching the light-adjusting structure between the first intermediate layer and the second intermediate layer, and sandwiching the first intermediate layer and the second intermediate layer between the first glass and the second glass;

arrangement: arranging the second edge-sealing material on the edge of the light-adjusting structure during the overlapping process to obtain an attached light-adjusting structure;

lamination: vacuumizing the first glass, the first intermediate layer, the attached light-adjusting structure, the second intermediate layer and the second glass which are overlapped and sending the same into an autoclave for heating and laminating.

According to the above technical concept, the embodiments of the edge sealing process of a light-adjusting glass of the present disclosure may further include any one or more of the following optional forms.

In some optional forms, the arrangement further comprises: arranging a third edge-sealing material on the edge of the first intermediate layer and/or arranging a fourth edge-sealing material on the edge of the second intermediate layer during the overlapping process to obtain an attached first intermediate layer and/or an attached second intermediate layer; the lamination further comprises: vacuumizing the first glass, the first intermediate layer or the attached first intermediate layer, the attached light-adjusting structure, the second intermediate layer or the attached second intermediate layer and the second glass which are overlapped and sending the same into an autoclave for heating and laminating.

In some optional forms, in the arrangement, the second edge-sealing material is sandwiched between the first intermediate layer and the light-adjusting structure and between the second intermediate layer and the light-adjusting structure adjacent to the edge of the light-adjusting structure, and extends beyond the edge of the light-adjusting structure; in the lamination, the extended portion of the second edge-sealing material covers the edge of the light-adjusting structure.

In some optional forms, in the arrangement, the second edge-sealing material is sandwiched between the first intermediate layer and the second intermediate layer adjacent to the edge of the light-adjusting structure, and covers the edge of the light-adjusting structure to form a U-shaped structure; in the lamination, the second edge-sealing material covers the edge of the light-adjusting structure.

According to the present disclosure, the edge of the light-adjusting structure can be effectively sealed by providing the edge-sealing area and combining the material selection and curing manner of the first edge-sealing material. When the light-adjusting structure is applied to the light-adjusting glass or the light-adjusting glass of the present disclosure is adopted, the light-adjusting effect can be guaranteed without affecting the performance and aesthetics of the glass itself, and the user experience can be improved.

BRIEF DESCRIPTION OF THE DRAWINGS

Other features and advantages of the present disclosure will be better understood by the following alternative embodiments described in detail in conjunction with the accompanying drawings, in which the same reference numerals identify the same or similar components, and in different embodiments, the same or similar components are labeled in the same way with respect to the last one or two digits, in the drawings.

DETAILED DESCRIPTION OF EMBODIMENTS

Figure 1:
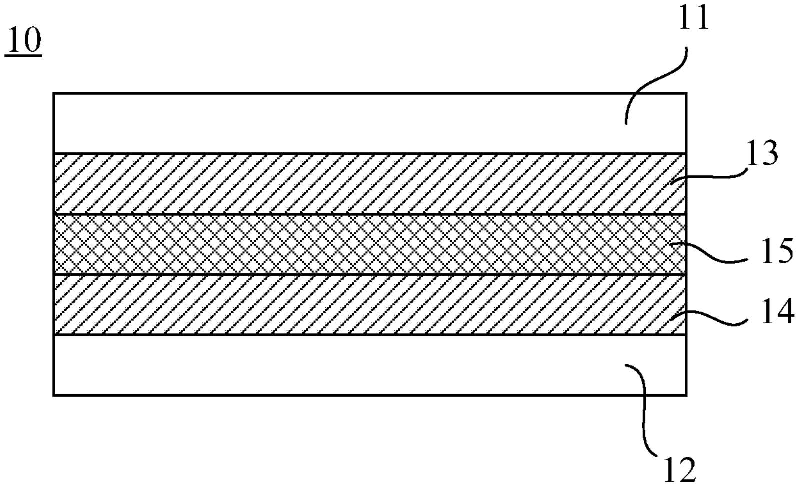
FIG. 1 is a schematic cross-sectional view of a conventional light-adjusting film.

The implementation and use of the embodiments are discussed in detail below. However, it should be understood that the specific embodiments discussed merely exemplify the specific ways of implementing and using the present disclosure, and do not limit the scope of the disclosure. When describing the structural positions of various components, such as the directions of upper, lower, top, bottom, etc., the description is not absolute, but relative. When the various components are arranged as shown in the figures, these directional expressions are appropriate, but when the positions of the various components in the figures would be changed, these directional expressions would also be changed accordingly.

In this context, the expression "including" or similar expressions "including", "containing" and "having" which are synonymous are open, and do not exclude additional unlisted elements, steps or ingredients. The expression "consisting of . . . " excludes any element, step or ingredient that is not specified. The expression "consisting essentially of . . . " means that the scope is limited to the specified elements, steps or ingredients, plus the optional elements, steps or ingredients that do not materially affect the basic and new features of the claimed subject matter. It should be understood that the expression "comprising" covers the expressions "consisting essentially of" and "consisting of".

In this context, the terms "first", "second", "third" and "fourth" are not used to limit the sequence and the number of components unless otherwise stated.

In this context, "glass" is an amorphous inorganic non-metallic material, which is generally made of a variety of inorganic minerals (such as quartz sand, borax, boric acid, barite, barium carbonate, limestone, feldspar, soda ash, etc.) as main raw materials, and a small amount of auxiliary raw materials. Its main components are silica and other oxides. In the described embodiments, the thickness of the glass is the thickness commonly used in the art, and the thickness of the interlayer between the glasses is suitable for the conventional range, and is not limited as shown in the figures. In addition, although it is shown as plane glass in the figures, the glass of the present disclosure can be curved glass, that is, curved functional laminated glass suitable for vehicle.

In addition, although the layers are close to each other in the figures, there may be air bubbles between the layers in actual products, but it does not affect the use.

Light-Adjusting Structure

A light-adjusting film will be explained below as an example of the light-adjusting structure. It can be understood that the light-adjusting structure can also include a light-adjusting coating and other structures. According to the concept of the present disclosure, an edge-sealing area is arranged on the edge of the light-adjusting film, and the edge of the light-adjusting film is sealed by providing a first edge-sealing material in the edge-sealing area, so that the required light-adjusting effect can be ensured when the light-adjusting film is applied to the glass.

FIGS. 2*a* to 3*b* respectively show different embodiments of the light-adjusting film according to the present disclosure. In the embodiment shown in FIG. 2*a*, the light-adjusting film is shown by 20. The light-adjusting film 20 includes a first base layer 21 and a second base layer 22, with a first conductive layer 23 attached to the first base layer 21 and a second conductive layer 24 attached to the second base layer 22, and a light-adjusting layer 25 sandwiched between the first conductive layer 23 and the second conductive layer 24. Alternatively, the first base layer 21 and the second base layer 22 are transparent materials selected from at least one of polyethylene terephthalate (PET) and polyvinyl chloride (PVC). The first conductive layer 23 and the second conductive layer 24 are transparent materials selected from at least one of indium tin oxide (ITO), copper mesh, silver screen printing, conductive nanoparticles (carbon nanotubes and silver nanowires), conductive polymer and doped inorganic oxide. The light-adjusting layer 25 includes a polymer dispersed liquid crystal (PDLC), a suspended particle device (SPD), an electrochromic layer (EC) or a liquid crystal layer (LC).

Figure 2A:
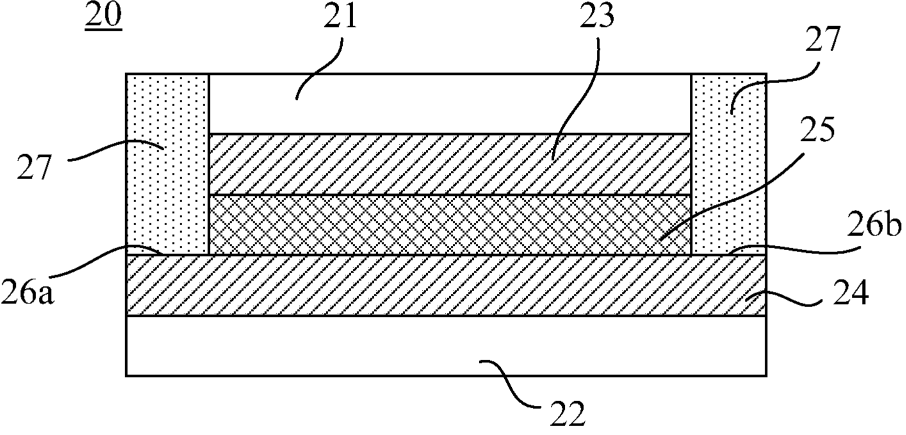
FIG. 2*a* is a schematic cross-sectional view of a light-adjusting film according to one embodiment of the present disclosure.
Figure 2B:
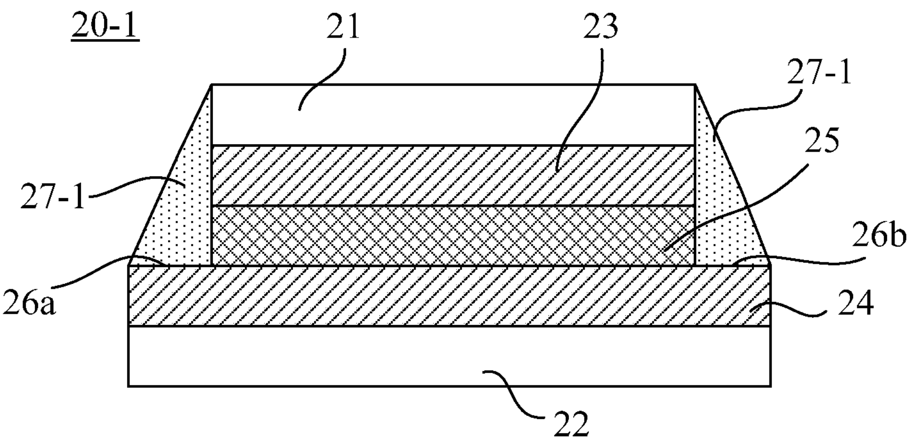
FIG. 2*b* is similar to FIG. 2*a*, showing a schematic cross-sectional view of a light-adjusting film according to another embodiment.

In the embodiment shown in FIG. 2a, the edge-sealing areas 26a, 26b penetrate through at least a part of the first base layer 21, the first conductive layer 23 and the light-adjusting layer 25, so as to partially or completely seal the edge of the light-adjusting film 20.

Figure 3A:
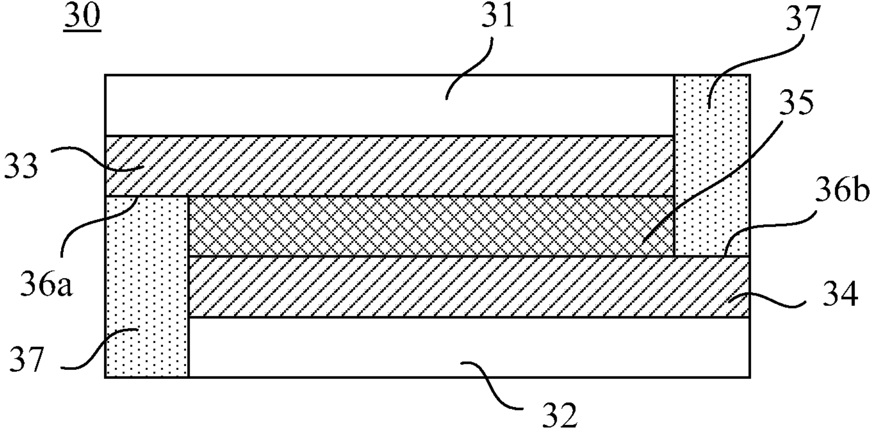
FIG. 3*a* is a schematic cross-sectional view of a light-adjusting film according to another embodiment of the present disclosure.
Figure 3B:
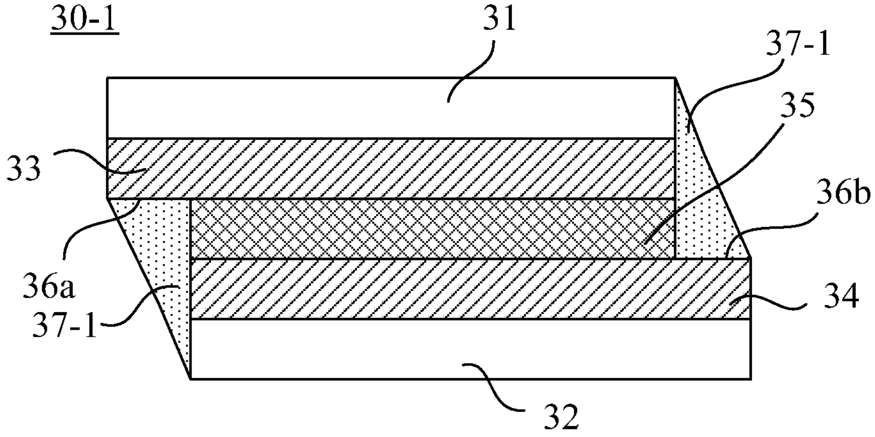
FIG. 3*b* is similar to FIG. 3*a*, showing a schematic cross-sectional view of a light-adjusting film according to another embodiment.

In the light-adjusting film 30 of the embodiment shown in FIG. 3a, the edge-sealing area 36b penetrates through at least a part of the first base layer 31, the first conductive layer 33 and the light-adjusting layer 35, while the edge-sealing area 36a penetrates through at least a part of the second base layer 32, the second conductive layer 34 and the light-adjusting layer 35. In some embodiments, similar to FIG. 3a, the edge-sealing area of FIG. 2a can also penetrate through at least a part of the second base layer 22, the second conductive layer 24 and the light-adjusting layer 25.

It should be understood that the edge-sealing area surrounds the periphery of the light-adjusting film, or the edge-sealing area is adjacent to the periphery, so that it is suitable for different structural layouts under the condition of edge sealing. Based on the desired edge-sealing position and edge-sealing effect, in some embodiments, the edge-sealing area can be configured as an edge-sealing groove adjacent to the edge of the light-adjusting film to provide a larger contact area or sealing area between the first edge-sealing material and the light-adjusting layer. In some embodiments, the edge-sealing area can be configured as an edge-sealing step arranged at the edge of the light-adjusting film, as shown in FIG. 2a or FIG. 3a. By adopting the edge-sealing step, the edge-sealing area is easy to be cleaned and the edge-sealing material is easily coated. It is difficult to detach due to the stronger adhesive force, so that good sealing performance can be obtained. In some embodiments, the edge-sealing groove and the edge-sealing step can also be combined as the edge-sealing area.

In FIG. 2a, the first edge-sealing material 27 may be provided in the edge-sealing areas 26a, 26b, and in FIG. 3a, the first edge-sealing material 37 may be provided in the edge-sealing areas 36a, 36b. The first edge-sealing material can be applied in the edge-sealing area during the preparation of the light-adjusting film. Alternatively, the first edge-sealing material can be applied to the edge-sealing area on site before or when the light-adjusting film with the edge-sealing area is applied to the glass, so as to avoid unfavorable factors affecting the edge-sealing effect during transportation or storage.

The first edge-sealing material should have no plasticizer or only contain a small amount of plasticizer, so that it will not react with the light-adjusting layer and solve the defects of the light-adjusting film caused by plasticizer erosion. Alternatively, the first edge-sealing material is a transparent material selected from at least one of epoxy adhesive, acrylate adhesive, polyurethane adhesive and silicone adhesive. With the selection of different materials and combinations of the first edge-sealing material, the conductive layer and the base layer, the various layers of the light-adjusting film can have good adhesive force, thus ensuring the edge-sealing effect and the stability in actual use.

It should be understood that in FIGS. 2a and 3a, the light-adjusting film takes a rectangular cross section as an example, and the edge-sealing areas are respectively arranged at both ends. However, it does not mean to limit the number and shape of the edge-sealing areas. For example, when the light-adjusting film is polygonal, a plurality of edge-sealing areas corresponding to the multiple sides of the light-adjusting film can be provided to seal each edge, or it can be configured as a single annular area. When the light-adjusting film is round or quasi-round, the edge-sealing area is a single annular area. In other words, the edge-sealing areas 26a, 26b in FIG. 2a can be integrally formed. In addition, although as shown in FIG. 2a, the width of the first edge-sealing material 27 is the same, the cross section of the first edge-sealing material 27 can be alternatively tapered or formed into a specific shape according to the actual gluing process. As an example, FIG. 2b and FIG. 3b respectively show a light-adjusting film 20-1 similar to FIG. 2a and a light-adjusting film 30-1 similar to FIG. 3a, wherein the first edge-sealing material 27-1 of the light-adjusting film 20-1 has a triangular cross-section that tapers from the light-adjusting layer 25 to the first base layer 21, and the first edge-sealing material 37-1 of the light-adjusting film 30-1 has a triangular cross-section that tapers from the light-adjusting layer 35 to the first base layer 31 and the second base layer 32, respectively. Therefore, the edge-sealing effect is obtained, and the material can also be saved and the cost benefit can be obtained.

Edge Sealing Process of Light-Adjusting Film

The edge-sealing process for edge sealing the light-adjusting film of the present disclosure at least comprises:

cutting: cutting through at least a part of the first base layer, the first conductive layer and the light-adjusting layer and/or at least a part of the second base layer, the second conductive layer and the light-adjusting layer of the light-adjusting film to form the edge-sealing area;

gluing: coating the first edge-sealing material on the edge-sealing area;

curing: curing the first edge-sealing material to form an edge sealing.

In the cutting, any suitable cutting tool can be used, including but not limited to laser cutter, electrode knife, etc.

In some embodiments, after the cutting, the edge-sealing area is further cleaned with a solvent to remove oil stains and other impurities. Alternatively, the solvent includes, but is not limited to, organic solvent such as alcohol or acetone. Among them, the alcohol concentration can be selected as 95%.

In the gluing, any suitable gluing device can be used to coat the first edge-sealing material, including but not limited to needle cylinder, manual glue gun, pneumatic automatic dispensing machine, etc.

In the curing, the first edge-sealing material is cured by one or a combination of thermal curing, light curing and environmental curing. For the selected materials, for example, ultraviolet curing lamp such as metal halogen lamp and mercury lamp can be used to achieve UV curing, or heat curing combined with light curing such as heater and incubator can be used.

Light-Adjusting Glass

Another aspect of the present disclosure provides a light-adjusting glass with a light-adjusting film. FIGS. 4 to 8c respectively show different embodiments of the light-adjusting glass according to the present disclosure. In each figure, one light-adjusting film is taken as an example. It should be understood that multiple light-adjusting films can be arranged on the light-adjusting glass to realize the light-adjusting function in different areas. Depending on the shapes of different light-adjusting layers or different light-adjusting films, these light-adjusting films can be respectively and independently edge-sealed by edge-sealing materials, or a plurality of light-adjusting films can be combined, and each edge that may react with the intermediate layer of the light-adjusting glass is edge sealed.

Figure 4:
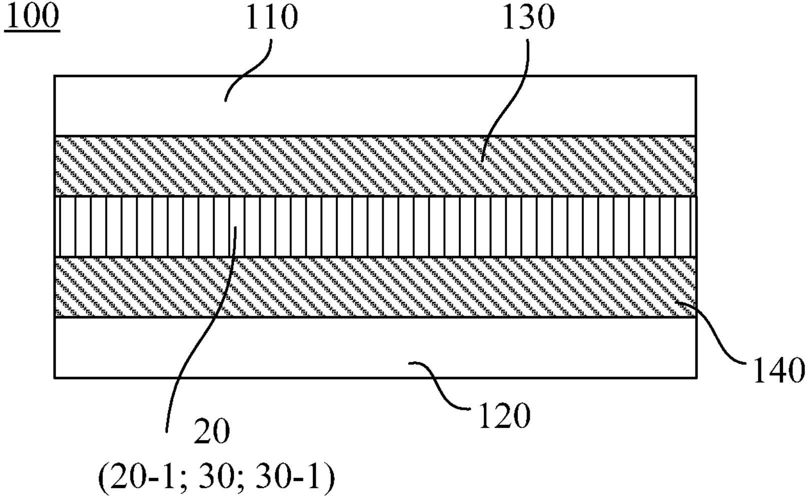
FIG. 4 is a schematic cross-sectional view of a light-adjusting glass according to an embodiment of the present disclosure.

First, referring to an embodiment shown in FIG. 4, a light-adjusting glass 100 includes a first glass 110, a second glass 120, and an intermediate layer disposed between the first glass 110 and the second glass 120. The intermediate layer includes a first intermediate layer 130 attached to the first glass 110 and a second intermediate layer 140 attached to the second glass 120, wherein a light-adjusting film is sandwiched between the first intermediate layer 130 and the second intermediate layer 140, and the light-adjusting film is attached to the first intermediate layer 130 and the second intermediate layer 140.

In this embodiment, based on the selection of the light-adjusting layer in the light-adjusting film, the light-adjusting film may have its own edge-sealing area, that is, as shown in FIG. 4, the above-mentioned light-adjusting film 20 (20-1, 30 or 30-1) is adopted, and the edge-sealing area is configured to be matched with or be provided with a first edge-sealing material. In this case, the first edge-sealing material in the edge-sealing area can be regarded as the second edge-sealing material, and the light-adjusting glass 100 can have a good edge-sealing effect.

In some embodiments, if the light-adjusting film itself is not provided with an edge-sealing area, or if the light-adjusting film itself is provided with an edge-sealing area, the edge of the light-adjusting film can be attached to the first intermediate layer and the second intermediate layer via a second edge-sealing material, wherein the second edge-sealing material may be the same as or different from the first edge-sealing material.

Figure 5:
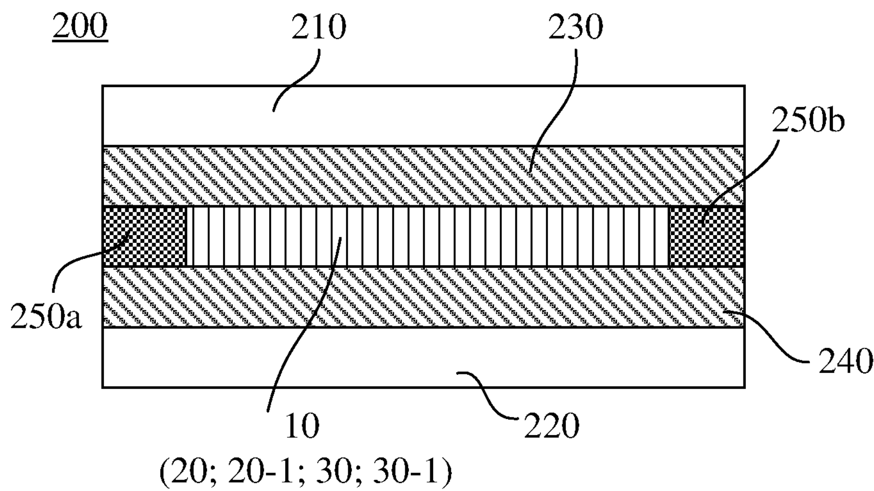
FIG. 5 is a schematic cross-sectional view of a light-adjusting glass according to another embodiment of the present disclosure.

Specifically, a light-adjusting glass 200 according to an embodiment shown in FIG. 5 includes a first glass 210 and a second glass 220, and a light-adjusting film is sandwiched between a first intermediate layer 230 and a second intermediate layer 240. The light-adjusting film can be the light-adjusting film 10 shown in FIG. 1 without an edge-sealing area, or the light-adjusting films 20, 20-1, 30 or 30-1 with edge-sealing areas shown in FIGS. 2*a* to 3*b*. In this embodiment, second edge-sealing materials 250*a*, 250*b* are arranged around the periphery of the light-adjusting film, that is, formed integrally, and can also seal a specific edge for a specific light-adjusting film shape, thereby attaching the edge of the light-adjusting film to the first intermediate layer 230 and the second intermediate layer 240. Alternatively, the second edge-sealing material is a transparent material selected from at least one of epoxy adhesive, acrylate adhesive, polyurethane adhesive, silicone adhesive, ethylene-vinyl acetate copolymer (EVA), polyethylene terephthalate (PET) and polyolefin elastomer (POE).

Figure 6:
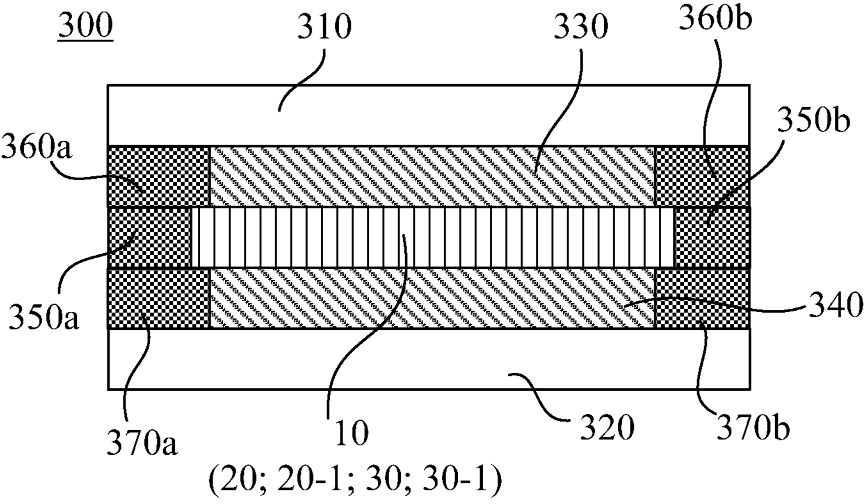
FIG. 6 is a schematic cross-sectional view of a light-adjusting glass according to another embodiment of the present disclosure.

To obtain a more effective edge-sealing effect, a light-adjusting glass 300 according to an embodiment shown in FIG. 6 may further include, in addition to second edge-sealing materials 350*a*, 350*b* attached to the edge of the light-adjusting film 10 (20, 20-1, 30, 30-1), third edge-sealing materials 360*a*, 360*b* attached to the edge of a first intermediate layer 330 and/or fourth edge-sealing materials 370*a*, 370*b* attached to the edge of a second intermediate layer 340. The edge seal between the first intermediate layer 330 and a first glass 310 is obtained by the third edge-sealing materials 350*a*, 350*b*, and the edge seal between the second intermediate layer 340 and a second glass 320 is obtained by the fourth edge-sealing materials 370*a*, 370*b*. The third edge-sealing materials 360*a*, 360*b* and the fourth edge-sealing materials 370*a*, 370*b* may be the same or different, for example, the same or similar materials as the second edge-sealing materials mentioned above may be selected. In some embodiments, the third edge-sealing material and/or the fourth edge-sealing material may be the same as or different from the second edge-sealing materials 350*a*, 350*b*.

In some embodiments, the second edge-sealing material, the third edge-sealing material, and the fourth edge-sealing material correspond to annular shapes, that is, they are each integrally formed. In the exemplary embodiment shown in FIG. 6, the inner edges of the annular shapes corresponding to the third edge-sealing materials 360*a*, 360*b* and the fourth edge-sealing materials 370*a*, 370*b* are indented relative to the inner edge of the annular shape corresponding to the second edge-sealing materials 350*a*, 350*b*, thereby playing a role of covering and sealing the periphery of the light-adjusting film, and further improving the sealing effect.

It should be understood that the sizes of the areas corresponding to the second edge-sealing material, the third edge-sealing material and the fourth edge-sealing material shown in FIGS. 5 and 6 are not intended to be limited. Depending on different actual needs, the size of the area corresponding to each edge-sealing material can be the same or different. Advantageously, the thickness of each edge-sealing material is approximately the same as the thickness of the light-adjusting film and the thickness of the intermediate layer, respectively, as shown in FIG. 6. However, in the lamination process of the glass, the edge-sealing materials will melt or even bond (when the materials are the same) under the condition of high temperature and high pressure, and the thickness of each edge-sealing material can also be different. Furthermore, in the shown structure, the edge of each edge-sealing material is flush with the edge of the intermediate layer or the edge of the glass, however, in some embodiments, the edge of each edge-sealing material may not be flush with the edge of the intermediate layer or the edge of the glass, as long as the edge-sealing material has sufficient adhesive force to seal the edge of the light-adjusting film and attach to the intermediate layer or the glass.

Figure 7A:
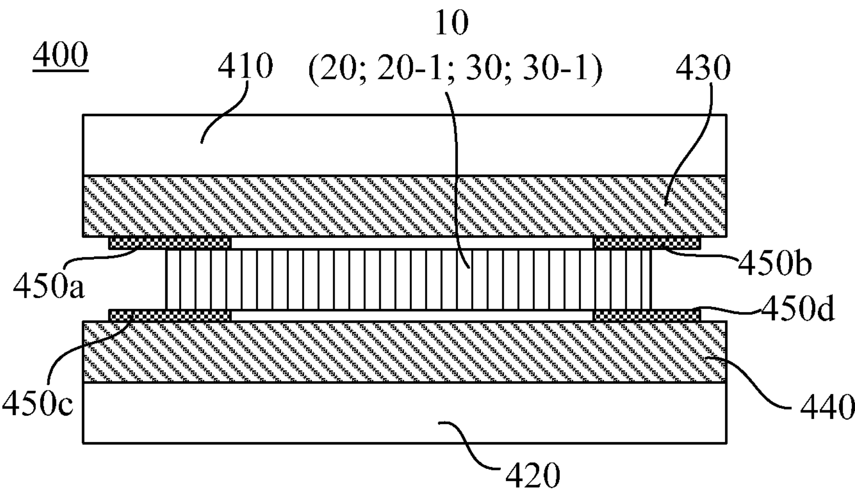
FIG. 7*a* is a schematic cross-sectional view of a light-adjusting glass according to another embodiment of the present disclosure, in which the second edge-sealing material has not yet covered the edge of the light-adjusting film.

FIGS. 7*a* to 8*c* show two other forms of the second edge-sealing material. In FIG. 7*a*, a light-adjusting glass 400 includes a first glass 410 and a second glass 420, and a light-adjusting film 10 (20, 20-1, 30, 30-1) is sandwiched between a first intermediate layer 430 and a second intermediate layer 440. The second edge-sealing material is provided as film layers sandwiched between the first intermediate layer 430 and the light-adjusting film and between the second intermediate layer 440 and the light-adjusting film adjacent to the edge of the light-adjusting film, for example, film layers 450*a*, 450*b* sandwiched between the first intermediate layer 430 and the light-adjusting film, and film layers 450*c*, 450*d* sandwiched between the second intermediate layer 440 and the light-adjusting film. In some embodiments, the film layers 450*a*, 450*b* are integrally formed to form a ring shape, and the film layers 450*c*, 450*d* are integrally formed to form a ring shape. Furthermore, as shown in FIG. 7*a*, each film layer has a portion extending beyond the edge of the light-adjusting film, and the extended portion of the film layer will cover the edge of the light-adjusting film in the lamination process of the light-adjusting glass, thereby realizing sealing.

It should be understood that the film layer here has a relatively small thickness compared with the thickness of the light-adjusting film and the intermediate layer. However, the thickness of each film layer is not limited, and can be selected as 0.10~0.20 mm, such as 0.188 mm, or 0.30~0.50 mm, such as 0.38 mm. Moreover, the film layers 450*a*, 450*b* and the film layers 450*c*, 450*d* may have the same thickness or different thicknesses, as long as they meet the sealing requirements and appearance requirements after being laminated. The length of each film layer sandwiched between the intermediate layer and the light-adjusting film and the length of each film layer extending beyond the edge of the light-adjusting film may be the same or different, but it is required that the extended portion can at least completely seal the edge of the light-adjusting film during the lamination.

In some embodiments, PVB or the like can also be used to form a picture frame structure. In this way, the picture frame can make the light-adjusting film achieve a predetermined position to fill the height difference between the edge of the light-adjusting film 10 (20, 20-1, 30, 30-1) and the first intermediate layer 430 and the second intermediate layer 440, and ensure complete sealing after the lamination.

Figure 7B:
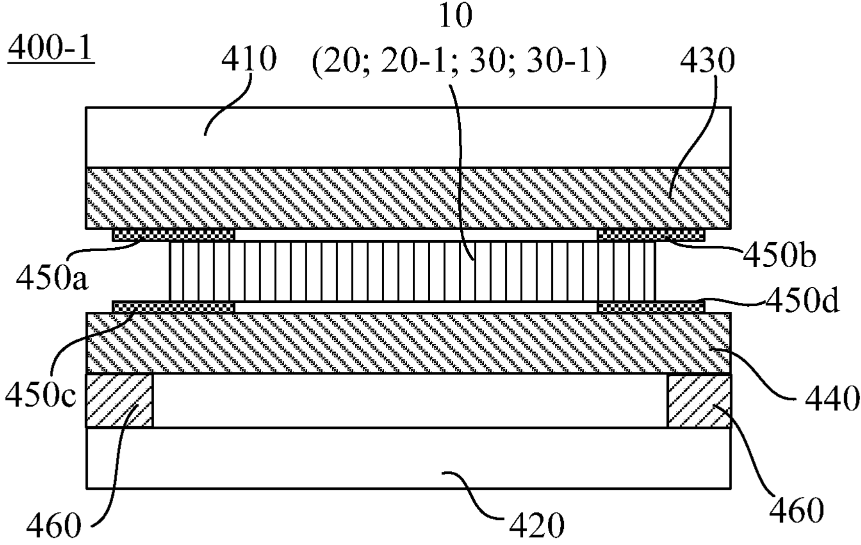
FIG. 7*b* is similar to FIG. 7*a*, showing a schematic cross-sectional view of another embodiment of a light-adjusting glass.
Figure 7C:
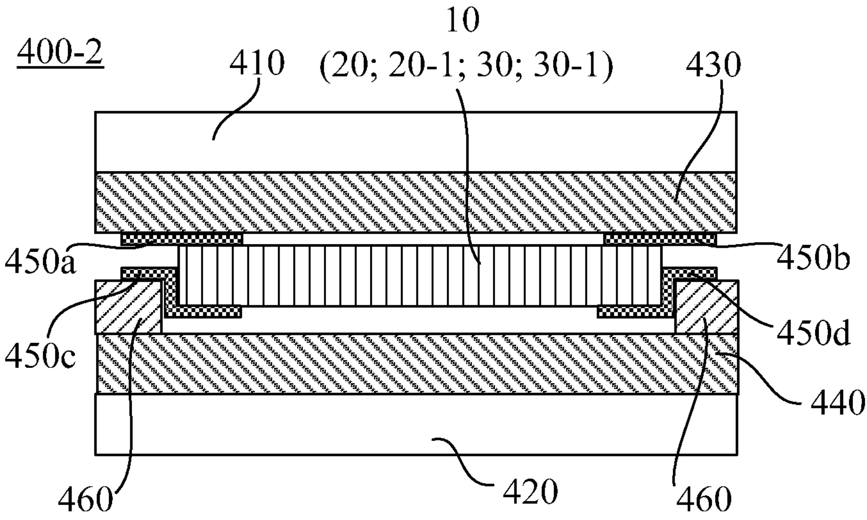
FIG. 7*c* is similar to FIG. 7*a*, showing a schematic cross-sectional view of another embodiment of a light-adjusting glass.

A light-adjusting glass 400-1 of an embodiment shown in FIG. 7*b* is different from the light-adjusting glass 400 of FIG. 7*a* in that a picture frame 460 is arranged between the second intermediate layer 440 and the second glass 420. The picture frame 460 can compensate for the thickness gap caused by the light-adjusting film. Alternatively, the picture frame 460 may be disposed between the first glass 410 and the first intermediate layer 430. Another embodiment of a light-adjusting glass 400-2 shown in FIG. 7*c* is different from the above-mentioned light-adjusting glass 400-1 in FIG. 7*b* in that the picture frame 460 is disposed between the first intermediate layer 430 and the second intermediate layer 440, that is, the picture frame 460 is arranged around the light-adjusting film 10 (20, 20-1, 30, 30-1). It should be noted that in the embodiment shown in FIG. 7*c*, the picture frame 460 is arranged in contact with the second intermediate layer 440 and surrounds the light-adjusting film 10 (20, 20-1, 30, 30-1). In order to prevent the picture frame 460 made of PVB from contacting with the light-adjusting film and causing reaction, the edges of the film layers 450*c*, 450*d* extending beyond the light-adjusting film 10 (20, 20-1, 30, 30-1) are overlapped on the picture frame 460 to form a space. Alternatively, when the picture frame 460 is arranged in contact with the first intermediate layer 430, the picture frame 460 and the light-adjusting film 10 (20, 20-1, 30, 30-1) can be spaced by overlapping the edges of the film layers 450*a*, 450*b* extending beyond the light-adjusting film 10 (20, 20-1, 30, 30-1) on the picture frame 460. In some embodiments, the edges of the film layers 450*a*, 450*b* and the edges of the film layers 450*c*, 450*d* extending beyond the light-adjusting film are overlapped on the picture frame 460 to form a space, so as to obtain complete sealing of the light-adjusting film after the lamination. It should be understood that the cross-sectional shape and thickness of the picture frame 460 are not limited to those shown in the figures, as long as it is suitable for positioning the light-adjusting film. After the lamination process, the picture frame 460, the first intermediate layer 430 and the second intermediate layer 440 are melted and bonded together at high temperature and high pressure, ensuring complete sealing after the lamination.

Figure 8A:
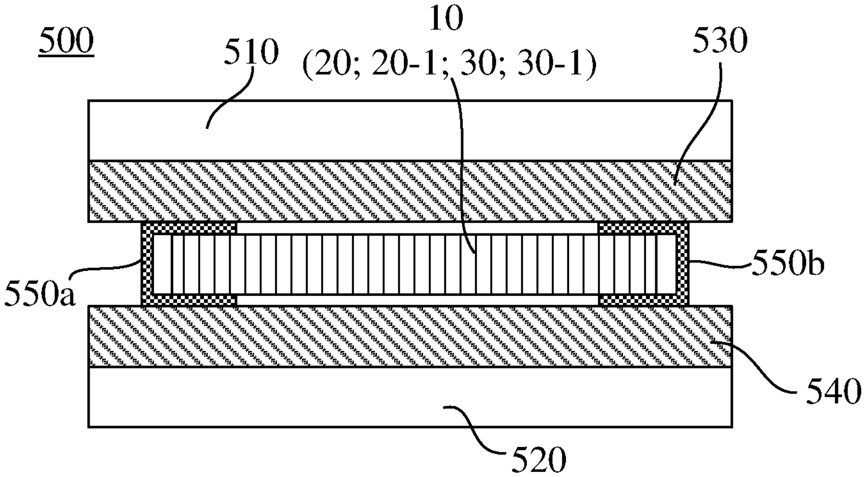
FIG. 8*a* is a schematic cross-sectional view of a light-adjusting glass according to another embodiment of the present disclosure, in which the second edge-sealing material has not yet covered the edge of the light-adjusting film.

In an exemplary embodiment shown in FIG. 8*a*, a light-adjusting glass 500 includes a first glass 510 and a second glass 520, and the light-adjusting film 10 (20, 20-1, 30, 30-1) is sandwiched between a first intermediate layer 530 and a second intermediate layer 540. The second edge-sealing materials 550*a*, 550*b* are configured as a U-shaped structure sandwiched between the first intermediate layer 530 and the second intermediate layer 540 adjacent to the edge of the light-adjusting film and covering the edge of the light-adjusting film. In this way, in the lamination process, the edge-sealing material with U-shaped structure can completely seal the edge of the light-adjusting film.

Figure 8B:
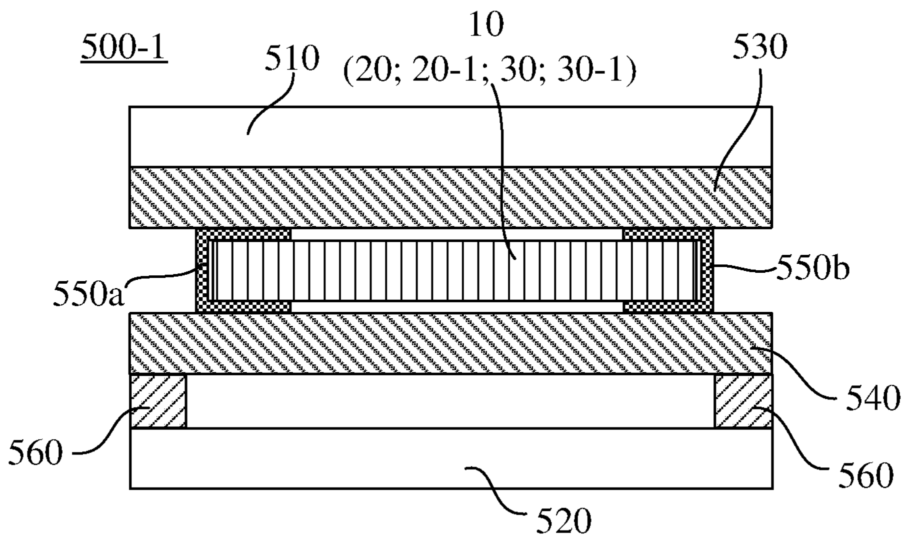
FIG. 8*b* is similar to FIG. 8*a*, showing a schematic cross-sectional view of another embodiment of a light-adjusting glass.
Figure 8C:
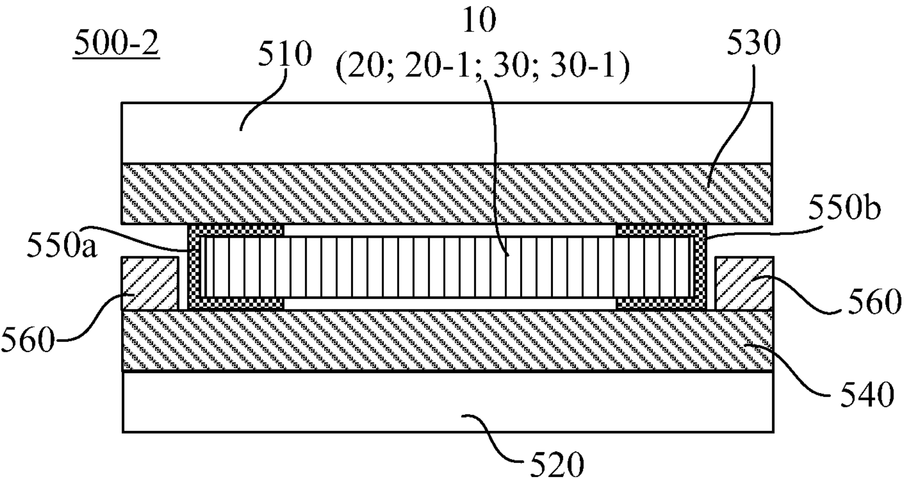
FIG. 8*c* is similar to FIG. 8*a*, showing a schematic cross-sectional view of another embodiment of a light-adjusting glass.

A light-adjusting glass 500-1 of an embodiment shown in FIG. 8*b* is different from the light-adjusting glass 500 of FIG. 8*a* in that a picture frame 560 is arranged between the second intermediate layer 540 and the second glass 520. The picture frame 560 can compensate for the thickness gap caused by the light-adjusting film. Alternatively, the picture frame 560 may be disposed between the first glass 510 and the first intermediate layer 530. Another embodiment of a light-adjusting glass 500-2 shown in FIG. 8*c* is different from the light-adjusting glass 500-1 in FIG. 8*b* in that the picture frame 560 is disposed between the first intermediate layer 530 and the second intermediate layer 540, that is, the picture frame 560 is arranged around the light-adjusting film 10 (20, 20-1, 30, 30-1).

In addition, in FIGS. 7*a* to 8*c*, although the edges of the film layers 450*a*, 450*b*, 450*c* and 450*d* are not flush with the edge of the glass, the edges of the film layers 550*a*, 550*b* are not flush with the edge of the glass, the film layers 450*a*, 450*b*, 450*c* and 450*d* may alternatively be flush with the edge of the glass after subsequent lamination and other processes, and the film layers 550*a*, 550*b* after subsequent lamination and other processes can be flush with the edge of the glass, which can prevent the glass from being broken due to uneven thickness of the glass in the lamination process.

Edge Sealing Process of Light-Adjusting Glass

The edge sealing process for edge sealing of a light-adjusting glass of the present disclosure at least comprises:

- overlapping: sandwiching the light-adjusting film between the first intermediate layer and the second intermediate layer, and sandwiching the first intermediate layer and the second intermediate layer between the first glass and the second glass;
- arrangement: arranging the second edge-sealing material on the edge of the light-adjusting film in the overlapping process to obtain an attached light-adjusting film;
- lamination: vacuumizing the first glass, the first intermediate layer, the attached light-adjusting film, the second intermediate layer and the second glass which are overlapped and sending the same into an autoclave for heating and laminating.

The light-adjusting glass of the present disclosure is suitable for being formed by the lamination process for conventional laminated glass, such as being laminated and formed at high temperature and high pressure conditions of 10~14 bar and 120~140 degrees in the autoclave. In various cases where the laminated glass is provided with a coating, or the first glass and/or the second glass are colored glasses, or the glass has different light transmittance, the appearance of the formed light-adjusting glass and the sealing performance of the light-adjusting film can meet the requirements.

In some embodiments, as shown in FIG. 6, the arrangement further includes: arranging the third edge-sealing materials 360*a*, 360*b* on the edge of the first intermediate layer 330 and/or arranging the fourth edge-sealing materials 370*a*, 370*b* on the edge of the second intermediate layer 340 in the overlapping process to obtain an attached first intermediate layer and/or an attached second intermediate layer. The lamination also includes vacuumizing the first glass, the first intermediate layer or the attached first intermediate layer, the attached light-adjusting film, the second intermediate layer or the attached second intermediate layer and the second glass which are overlapped and sending the same into an autoclave for heating and laminating.

In some embodiments, as shown in FIG. 7*a*, in the arrangement, the second edge-sealing material (such as the film layers 450a, 450b) is sandwiched between the first intermediate layer 430 and the light-adjusting film 10 (20, 20-1, 30, 30-1) adjacent to the edge of the light-adjusting film 10 (20, 20-1, 30, 30-1), and the second edge-sealing material (such as the film layers 450c, 450d) is sandwiched between the second intermediate layer 440 and the light-adjusting film 10 (20, 20-1, 30, 30-1) adjacent to the edge of the light-adjusting film 10 (20, 20-1, 30, 30-1), and extends beyond the edge of the light-adjusting film 10 (20, 20-1, 30, 30-1). In the lamination, the extended portion of the second edge-sealing material (e.g., the film layers 450a, 450b, 450c, 450d) covers the edge of the light-adjusting film 10 (20, 20-1, 30, 30-1). With reference to FIG. 7b, different from the above manner, in the overlapping or the arrangement, the picture frame 460 is sandwiched between the second intermediate layer 440 and the second glass 420. In the lamination, the covered light-adjusting film 10 (20, 20-1, 30, 30-1) is positioned in the picture frame 460, and the picture frame 460 is integrated with the second intermediate layer 440. With reference to FIG. 7c, different from the above-mentioned manner, in the overlapping or the arrangement, the picture frame 460 is sandwiched between the first intermediate layer 430 and the second intermediate layer 440, and the edge of the second edge-sealing material (e.g., the film layers 450c, 450d) extending beyond the light-adjusting film 10 (20, 20-1, 30, 30-1) is overlapped on the picture frame 460. In the lamination, the covered light-adjusting film 10 (20, 20-1, 30, 30-1) is positioned in the picture frame 460, and the picture frame 460 is integrated with the first intermediate layer 430 and the second intermediate layer 440.

In some embodiments, as shown in FIG. 8a, in the arrangement, the second edge-sealing material (e.g., 550a, 550b) is sandwiched between the first intermediate layer 510 and the second intermediate layer 540 adjacent to the edge of the light-adjusting film 10 (20, 20-1, 30, 30-1) and covers the edge of the light-adjusting film 10 (20, 20-1, 30, 30-1) to form a U-shaped structure. In the lamination, the second edge-sealing material (e.g., 550a, 550b) covers the edge of the light-adjusting film 10 (20, 20-1, 30, 30-1). With reference to FIG. 8b, different from the above manner, in the overlapping or the arrangement, the picture frame 560 is sandwiched between the second intermediate layer 540 and the second glass 520. In the lamination, the covered light-adjusting film 10 (20, 20-1, 30, 30-1) is positioned in the picture frame 560, and the picture frame 560 is integrated with the second intermediate layer 540. With reference to FIG. 8c, unlike the above manner, in the overlapping or the arrangement, the picture frame 560 is sandwiched between the first intermediate layer 530 and the second intermediate layer 540. In the lamination, the covered light-adjusting film 10 (20, 20-1, 30, 30-1) is positioned in the picture frame 560, and the picture frame 560 is integrated with the first intermediate layer 530 and the second intermediate layer 540.

In the above-described embodiments, the edge-sealing design of the light-adjusting film or the light-adjusting glass of the present disclosure is not only suitable for the straight edge of the conventional light-adjusting film, but especially suitable for the light-adjusting film with non-straight edge, such as the special-shaped light-adjusting film with curved edge such as circle. In addition, from the point of view of material selection and edge sealing process, the present disclosure can save the cost and the production time, thus providing more flexibility for the design of the light-adjusting film and the light-adjusting glass.

It should be understood here that the embodiments shown in the figures only illustrate the optional architectures, shapes, sizes and arrangements of various optional components of the light-adjusting film and the light-adjusting glass with the light-adjusting film according to the present disclosure; however, it is only illustrative rather than restrictive, and other shapes, sizes and arrangements can be adopted without departing from the spirit and scope of the present disclosure.

The technical content and technical features of the present disclosure have been disclosed above. However, it can be understood that those skilled in the art can make various changes and improvements to the above disclosed concept under the creative idea of the present disclosure, all of which fall within the protection scope of the present disclosure. The description of the above embodiments is illustrative rather than restrictive, and the protection scope of the present disclosure is determined by the claims.

The invention claimed is:

1. An edge sealing process of a light-adjusting structure, which is used for edge sealing the light-adjusting structure the light-adjusting structure comprising:

a first base layer and a second base layer;

a first conductive layer and a second conductive layer sandwiched between the first base layer and the second base layer, the first conductive layer being attached to the first base layer and the second conductive layer being attached to the second base layer; and a light-adjusting layer sandwiched between the first conductive layer and the second conductive layer;

wherein the light-adjusting structure is provided with an edge-sealing area which penetrates through at least a part of the first base layer, the first conductive layer, the light-adjusting layer and/or at least a part of the second base layer, the second conductive layer and the light-adjusting layer, and the edge-sealing area is configured to be matched with a first edge-sealing material or provided with the first edge-sealing material, wherein the edge sealing process comprises:

cutting through (1) at least a part of the first base layer, the first conductive layer and the light-adjusting layer and/or (2) at least a part of the second base layer, the second conductive layer and the light-adjusting layer of the light-adjusting structure, the cutting forming the edge-sealing area;

gluing by coating the first edge-sealing material on the edge-sealing area, and curing the first edge-sealing material to form an edge sealing.

2. The edge sealing process of a light-adjusting structure according to claim 1, further comprising cleaning the edge-sealing area with a solvent after the cutting.

3. The edge sealing process of a light-adjusting structure according to claim 2, wherein the solvent comprises alcohol or acetone.

4. The edge sealing process of a light-adjusting structure according to claim 1, wherein the first edge-sealing material is cured by one or a combination of thermal curing, light curing and environmental curing.

5. An edge sealing process according to claim 1, wherein the cutting includes cutting through at least a part of the first base layer, the first conductive layer and the light-adjusting layer to form the edge-sealing area as an edge-sealing step adjacent the light-adjusting layer.

6. An edge sealing process according to claim 1, wherein the cutting includes cutting through at least a part of the second base layer, the second conductive layer and the light-adjusting layer to form the edge-sealing area as an edge-sealing step adjacent the light-adjusting layer.

7. An edge sealing process according to claim 1, wherein the first edge-sealing material is a transparent material and the transparent material is selected from at least one of epoxy adhesive, acrylate adhesive, polyurethane adhesive and silicone adhesive.

8. A light-adjusting glass comprising a first glass, a second glass and an intermediate adhesive layer arranged between the first glass and the second glass, the intermediate adhesive layer comprising a first intermediate adhesive layer attached to the first glass and a second intermediate adhesive layer attached to the second glass, wherein a light-adjusting structure is arranged between the first intermediate adhesive layer and the second intermediate adhesive layer, and an edge of the light-adjusting structure is attached to the first intermediate adhesive layer and the second intermediate adhesive layer via a second edge-sealing material, and wherein the light-adjusting glass further comprises a third edge-sealing material attached to an edge of the first intermediate adhesive layer and/or a fourth edge-sealing material attached to an edge of the second intermediate adhesive layer, and wherein the third edge-sealing material and/or the fourth edge-sealing material is different from the second edge-sealing material.

9. The light-adjusting glass according to claim 8, wherein the light-adjusting structure is provided with an edge-sealing area, and the edge-sealing area is configured to be matched with a first edge-sealing material or provided with the first edge-sealing material.

10. The light-adjusting glass according to claim 8, wherein the second edge-sealing material, the third edge-sealing material and the fourth edge-sealing material correspond to annular shapes, and wherein inner edges of the annular shapes corresponding to the third edge-sealing material and the fourth edge-sealing material are indented relative to an inner edge of the annular shape corresponding to the second edge-sealing material.

11. The light-adjusting glass according to claim 8, wherein the second edge-sealing material is configured as a film layer sandwiched between the first intermediate adhesive layer and the light-adjusting structure and sandwiched between the second intermediate adhesive layer and the light-adjusting structure adjacent to the edge of the light-adjusting structure, and the film layer extends beyond the edge of the light-adjusting structure and covers the edge of the light-adjusting structure during the lamination process of the light-adjusting glass.

12. The light-adjusting glass according to claim 8, further comprising a picture frame structure arranged between the first glass and the first intermediate adhesive layer, or between the second glass and the second intermediate adhesive layer.

13. The light-adjusting glass according to claim 11, further comprising a picture frame structure arranged between the first intermediate adhesive layer and the second intermediate adhesive layer, and an edge of the second edge-sealing material extending beyond the light-adjusting structure is overlapped on the picture frame structure.

14. The light-adjusting glass according to claim 8, wherein the second edge-sealing material is configured as a U-shaped structure sandwiched between the first intermediate adhesive layer and the second intermediate adhesive layer adjacent to the edge of the light-adjusting structure and covering the edge of the light-adjusting structure.

15. The light-adjusting glass according to claim 14, further comprising a picture frame structure arranged between the first intermediate adhesive layer and the second intermediate adhesive layer.

16. The light-adjusting glass according to claim 8, wherein the second edge-sealing material is a transparent material selected from at least one of epoxy adhesive, acrylate adhesive, polyurethane adhesive, silicone adhesive, ethylene-vinyl acetate copolymer, polyethylene terephthalate and polyolefin elastomer.

17. An edge sealing process of a light-adjusting glass, which is used for edge sealing the light-adjusting glass according to claim 8, wherein the edge sealing process comprises:

carrying out an overlapping by sandwiching the light-adjusting structure between the first intermediate adhesive layer and the second intermediate adhesive layer, and sandwiching the first intermediate adhesive layer and the second intermediate adhesive layer between the first glass and the second glass;

carrying out an arrangement by arranging the second edge-sealing material on the edge of the light-adjusting structure during the overlapping process to obtain an attached light-adjusting structure;

carrying out a lamination by vacuumizing the first glass, the first intermediate adhesive layer, the attached light-adjusting structure, the second intermediate adhesive layer and the second glass which are overlapped and sending the same into an autoclave for heating and laminating, wherein carrying out the arrangement further comprises: arranging a third edge-sealing material on an edge of the first intermediate adhesive layer and/or arranging a fourth edge-sealing material on an edge of the second intermediate adhesive layer during the overlapping process to obtain an attached first intermediate adhesive layer and/or an attached second intermediate adhesive layer, and wherein the lamination further comprises: vacuumizing the first glass, the first intermediate adhesive layer or the attached first intermediate adhesive layer, the attached light-adjusting structure, the second intermediate adhesive layer or the attached second intermediate adhesive layer and the second glass which are overlapped and sending the same into an autoclave for heating and laminating.

18. The edge sealing process of a light-adjusting glass according to claim 17, wherein in the arrangement, the second edge-sealing material is sandwiched between the first intermediate adhesive layer and the light-adjusting structure and between the second intermediate adhesive layer and the light-adjusting structure adjacent to the edge of the light-adjusting structure, and extends beyond the edge of the light-adjusting structure; in the lamination, the extended portion of the second edge-sealing material covers the edge of the light-adjusting structure.

19. The edge sealing process of a light-adjusting glass according to claim 17, wherein in the overlapping or the arrangement, a picture frame structure is sandwiched between the first glass and the first intermediate adhesive layer or between the second glass and the second intermediate adhesive layer; in the lamination, the attached light-adjusting structure is positioned in the picture frame structure.

20. The edge sealing process of a light-adjusting glass according to claim 18, wherein in the overlapping or the arrangement, a picture frame structure is sandwiched between the first intermediate adhesive layer and the second intermediate adhesive layer, and an edge of the second edge-sealing material extending beyond the light-adjusting structure is overlapped on the picture frame structure; in the lamination, the covered light-adjusting structure is positioned in the picture frame structure.

21. The edge sealing process of a light-adjusting glass according to claim 17, wherein in the arrangement, the second edge-sealing material is sandwiched between the first intermediate adhesive layer and the second intermediate adhesive layer adjacent to the edge of the light-adjusting structure, and covers the edge of the light-adjusting structure to form a U-shaped structure; in the lamination, the second edge-sealing material covers the edge of the light-adjusting structure.

22. The edge sealing process of a light-adjusting glass according to claim 21, wherein in the overlapping or the arrangement, a picture frame structure is sandwiched between the first intermediate adhesive layer and the second intermediate adhesive layer; in the lamination, the covered light-adjusting structure is positioned in the picture frame structure.

23. The light-adjusting glass according to claim 8, wherein the third edge-sealing material extends over an entire thickness of the edge of the first intermediate adhesive layer.

24. The light-adjusting glass according to claim 23, wherein the third edge-sealing material is in contact with the first glass.

25. The light-adjusting glass according to claim 8, wherein the third edge-sealing material is a transparent material and/or the fourth edge-sealing material is a transparent material; and/or the second edge-sealing material is for sealing the edge of the light-adjusting structure and/or the third edge-sealing material is for sealing the edge of the first intermediate adhesive layer and/or the fourth edge-sealing material is for sealing the edge of the second intermediate adhesive layer.

26. The light-adjusting glass according to claim 8, wherein the light-adjusting glass comprises the third edge-sealing material attached to the edge of the first intermediate adhesive layer and wherein the third edge-sealing material is different from the second edge-sealing material.

27. The light-adjusting glass according to claim 8, wherein the light-adjusting glass comprises the fourth edge-sealing material attached to the edge of the second intermediate adhesive layer, and wherein the fourth edge-sealing material is different from the second edge-sealing material.

28. The light-adjusting glass according to claim 8, wherein the light-adjusting glass further comprises both the third edge-sealing material attached to the edge of the first intermediate adhesive layer and the fourth edge-sealing material attached to the edge of the second intermediate adhesive layer, and wherein the third edge-sealing material and the fourth edge-sealing material are different from the second edge-sealing material.

29. The light-adjusting glass according to claim 26, wherein the second edge-sealing material and the third edge-sealing material correspond to annular shapes, and wherein an inner edge of the annular shape corresponding to the third edge-sealing material is indented relative to an inner edge of the annular shape corresponding to the second edge-sealing material.

30. The light-adjusting glass according to claim 27, wherein the second edge-sealing material and the fourth edge-sealing material correspond to annular shapes, and wherein an inner edge of the annular shape corresponding to the fourth edge-sealing material is indented relative to an inner edge of the annular shape corresponding to the second edge-sealing material.

31. The light-adjusting glass according to claim 28, wherein the second edge-sealing material, the third edge-sealing material and the fourth edge-sealing material correspond to annular shapes, and wherein inner edges of the annular shapes corresponding to the third edge-sealing material and the fourth edge-sealing material are indented relative to an inner edge of the annular shape corresponding to the second edge-sealing material.

32. The light-adjusting glass according to claim 12, wherein the picture frame structure is sandwiched between the first glass and the first intermediate adhesive layer, or sandwiched between the second glass and the second intermediate adhesive layer.

33. The light-adjusting glass according to claim 13, wherein the picture frame structure is sandwiched between the first intermediate adhesive layer and the second intermediate adhesive layer.

34. The light-adjusting glass according to claim 15, wherein the picture frame structure is sandwiched between the first intermediate adhesive layer and the second intermediate adhesive layer.

* * * * *